United States Patent [19]

Wilhelmi et al.

[11] 4,234,426
[45] Nov. 18, 1980

[54] WET COMBUSTION SYSTEM INCORPORATING AUTOREGULATION

[75] Inventors: Allan R. Wilhelmi, Wausau, Wis.; Daniel C. Troy, Litchfield, N.H.

[73] Assignee: Sterling Drug Inc., New York, N.Y.

[21] Appl. No.: 969,553

[22] Filed: Dec. 14, 1978

[51] Int. Cl.³ ............................................. C02F 1/72
[52] U.S. Cl. .................................... 210/149; 210/181
[58] Field of Search ................ 210/63 R, 149, 177, 210/180, 181

[56] References Cited

U.S. PATENT DOCUMENTS

| | | | |
|---|---|---|---|
| 4,013,560 | 3/1977 | Pradt | 210/63 R |
| 4,100,730 | 7/1978 | Pradt | 210/63 R |

*Primary Examiner*—Thomas G. Wyse
*Attorney, Agent, or Firm*—Charles R. Fay

[57] ABSTRACT

A wet air combustion system including a reactor, a steam boiler, a pressure control valve (PCV) to regulate the heat exchange of the boiler steam with the reactor effluent, and a sensor/responder coupled to the PCV monitoring the reactor influent temperature after preheat exchange with the partially cooled reactor effluent.

3 Claims, 2 Drawing Figures

WET COMBUSTION SYSTEM INCORPORATING AUTOREGULATION

BACKGROUND OF THE INVENTION

In conventional wet air oxidation, liquor containing oxidizable components is combined with an oxygen containing gas, such as air, and raised to elevated temperatures through both a preheat step in a heat exchanger and by the energy released in oxidation. The effluent, whether vapor or liquid or both, serves as the source of preheat.

Wet air oxidation systems are typically desiigned to operate at a constant reactor temperature.

When the concentration of oxidizable matter in the influent liquor increases, as measured by Chemical Oxygen Demand (COD), further oxidation results in increased heat evolution and a rise in effluent temperature. In conventional heat recovery, the increased effluent temperature will be reflected in an increased influent temperature, thereby aggravating the perturbation from steady state.

Alternately, when the influent liquor COD decreases, diminished heat generation reduces the energy available for preheat exchange and the temperature drop is further amplified.

In a wet air oxidation system having a preheat exchanger of fixed area, and processing influent liquor of variable COD and fouling tendencies, a means of preheat regulation over a wide range of duty and fouling is necessary to prevent detrimental excursions of reactor temperature.

DISCUSSION OF THE PRIOR ART

United States Pat. No. 2,903,425 teaches a method of control for continuous wet air oxidation of an aqueous dispersion of combustible material. Air flow in excess of stoichiometric combustion requirements evaporates the solvent aqueous medium to limits imposed by temperature and vapor partial pressure and concentrates the influent liquor to the minimum caloric value to sustain autogenous combustion. The desired initial temperature is produced by controlled heat exchange of the influent liquor with the reactor effluent. The disadvantage of this invention is the delicate adjustment of effluent diverted to heat exchange with the influent, which if poorly regulated, results in polymerization of the liquor and obstruction or "gunking" of the heat exchanger, as is attested to by U.S. Pat. No. 3,907,678.

U.S. Pat. No. 3,907,678 teaches control of air added prior to preheat exchange to reduce polymerization, but also teaches that such control alters the preheat exchanger temperature gradient affecting the extent of preheating. The spontaneity of control, that is, the ability to acutely adjust control to respond to a change in liquor oxidation requirements, is unsatisfactory as in the preceding patent.

U.S. Pat. No. 4,013,560 teaches yet a third method to control the extent of heat exchange of the reactor effluent and influent. Cyclically, the cooled reactor vapor to the expander-generator power recovery facility is heat exchanged with hot effluent from the reactor, the then cooled reactor effluent heat exchanged with the reactor influent, the vapor and liquid phases separated, and the vapor throttled prior to water injection and subsequent reheat and dissipation to recovery power.

SUMMARY OF THE INVENTION

This invention regulates the extent of preheating by autoregulation of the preheat temperature gradient. The effluent emanating from the reactor is heat exchanged with a boiler to generate steam of pressure determined by a pressure control valve (PCV) electromechanically coupled (sensor-responder) to the influent to the reactor. The steam temperature is a function of the steam pressure. The amount of cooling, that is, heat extracted from the reactor effluent, is a function of the generated steam temperature. In other words, the higher the steam temperature, the less cooling of the reactor effluent and vice versa. Thus, control of the steam pressure will control cooling of the reactor effluent. The temperature of the cooled effluent is a function of the amount of influent preheat, that is, the hotter the cooled effluent, the more influent preheat and vice versa. If the influent temperature tends to rise, indicating excessive preheat, the sensor will cause the steam pressure, and thus temperature, to decrease, causing greater effluent cooling and thus, less influent preheating, bringing the influent temperature back to the control point. Steady state operation obtains.

PREFERRED EMBODIMENTS OF THE INVENTION

Figure 1:
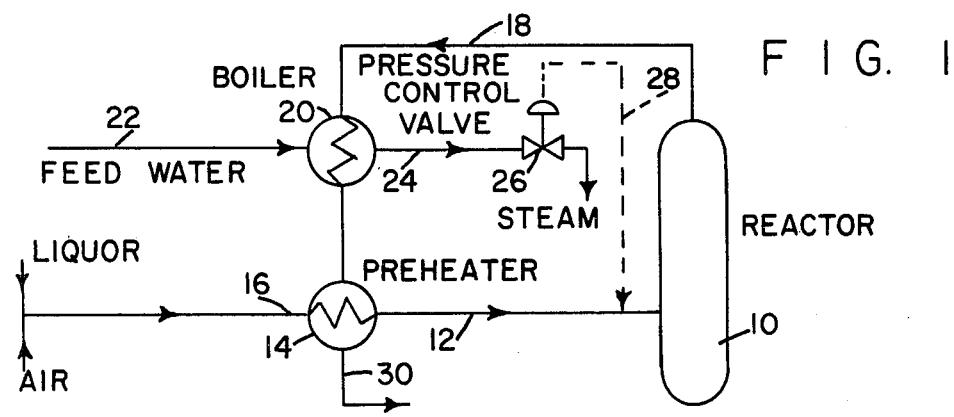
FIGS. 1 and 2 are diagrams demonstrating the application of this invention to regulate liquor influent temperature, differing only in the phase of effluent material which is heat exchanged.

FIG. 1 diagrams the mixing of ambient liquor and air 16, forming the influent to a preheat heat exchanger 14, which issues at a higher temperature sensed at 12 to the reactor 10, where oxidation of the liquor is completed. The effluent 18, both vapor and condensate, issue from the reactor and are heat exchanged with feed water 22 continuously supplied the boiler 20 generating steam 24 at a pressure determined by the pressure control valve (PCV) 26 setting coupled e.g. by line 28 and electromechanical means known in the art, to the reactor influent 12. The higher the boiler steam pressure and thus the higher the steam temperature, the less the temperature gradient between the reactor effluent and boiler steam, and the more high temperature heat is available for preheat exchange. If a higher preheat temperature than sensed at 12 is desired, the PCV 26 is adjusted to increase the boiler steam pressure reducing boiler-reactor effluent heat exchange even further. However, if a lower influent temperature than sensed at 12 is desired, the PCV 26 is adjusted to reduce the boiler steam pressure and correspondingly the steam temperature, increasing the temperature gradient between the reactor effluent and the boiler steam, transferring more heat to the latter and producing a low temperature heat for preheat 14 exchange with the influent 16. The temperature of the influent is thereby reduced. The reactor effluent issues from the preheat exchanger, line 30.

Figure 2:
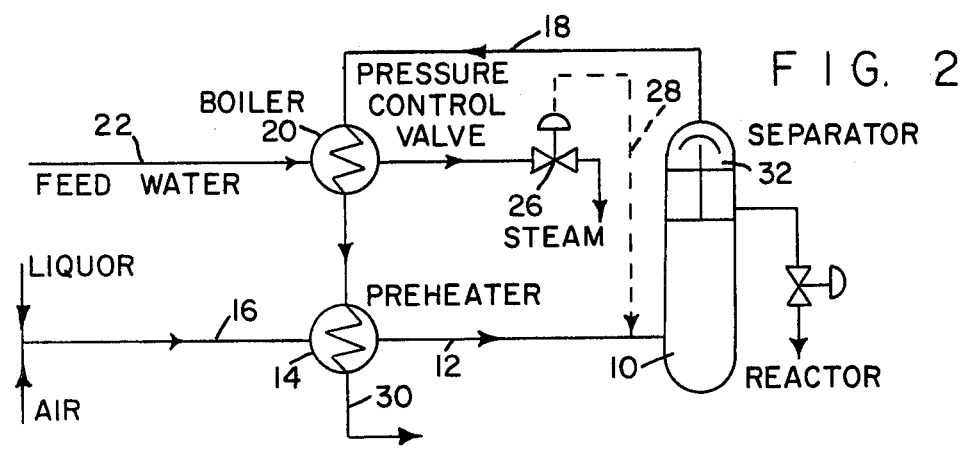

The wet air oxidation configuration which heat exchanges the reactor effluent without prior separation is proposed for application where the combustible material in the influent liquor is a minimum. Where the concentration of combustible material in the influent liquor is higher, the heat of combustion evaporates a substantial portion of the aqueous dispersing medium and only the vapor portion will be heat exchanged as illustrated in FIG. 2. The multiple advantage of this separation is the reduction in scaling deposition and consequent heat exchanger fouling which heat exchange of the liquor reactor effluent produces (This is the subject of U.S. Pat. No. 3,647,687 and need not be discussed further.), the isolation of the predominant heat generated in the wet air oxidation in a vapor amenable to subsequent power recovery, and the concentration of the liquid effluent brine stream most amenable to isolation and recovery of inorganics produced in the combustion, for example, of coke oven gas wastes to yield an ammonium sulfate brine.

FIG. 2 illustrates application of the invention similar to the prior embodiment, FIG. 1, but postheat exchanges the reactor vapor effluent only. FIG. 2 diagrams the mixing of ambient liquor and air inffluent to the preheat exchanger 14 which issues at a higher temperature sensed prior to oxidation in the reactor 10. The oxidized liquor is separated from the vapor at the exit end 32 of the reactor and diverted to an elective, but auspicious disposal. The reactor effluent vapor is postheat exchanged with feed water continuously supplied the boiler 20 generating steam at a pressure determined by the PCV 26 which is coupled e.g. as at 28, to the reactor influent. As previously explained for the embodiment of the invention depicted as FIG. 1, minimum postheat exchange affords maximum preheat exchange and a higher temperature reactor influent, and conversely. The extent of preheat exchange is contingent on the extent of postheat exchange which in turn is contingent on the auto feedback of temperature sensing of the influent interfaced to the PCV regulating the boiler steam-effluent postheat exchange.

We claim:

1. A wet combustion system comprising a reactor to oxidize an influent liquor admixed with an oxygen containing gas, a boiler, an effluent line from the reactor, said effluent line leading to the boiler, the latter cooling the reactor effluent in part, a process stream, means to heat said process stream by recovering residual energy from said partially cooled reactor effluent, said process stream leading to said heating means, an effluent line from the boiler to said heating means, a feed water source for the boiler, an exit line from the boiler for steam generated therein, a pressure control valve in the exit line, means sensing the temperature of the process stream, said means being coupled to and regulating the pressure control valve, and means to autoregulate the amount of heat extracted by the boiler.

2. The wet combustion system of claim 1 in which the oxygen containing gas is air, the process stream to which the pressure control valve is coupled is the reactor influent, and the means to recover heat from the partially cooled reactor effluent is a liquor preheat exchanger.

3. The wet combustion system of claim 2 including means to separate the vapor from the liquid effluent downstream of the reactor in which the reactor effluent partially cooled by heat exchange with the boiler is the vapor alone.

* * * * *